July 26, 1932. B. W. COLTMAN Re. 18,546

PROCESS OF AND MEANS FOR FLAKING SOAP

Original Filed Aug. 15, 1921 2 Sheets-Sheet 1

Inventor:
BERTRAM WM. COLTMAN:
By: Jones, Addington, Ames & Seibold
Attys.

July 26, 1932. B. W. COLTMAN Re. 18,546

PROCESS OF AND MEANS FOR FLAKING SOAP

Original Filed Aug. 15, 1921 2 Sheets-Sheet 2

Inventor.
BERTRAM Wm. COLTMAN.
By: Jones Addington Ames & Seibold.
Attys.

Reissued July 26, 1932 Re. 18,546

UNITED STATES PATENT OFFICE

BERTRAM W. COLTMAN, OF CHICAGO, ILLINOIS

PROCESS OF AND MEANS FOR FLAKING SOAP

Original No. 1,653,390, dated December 20, 1927, Serial No. 492,214, filed August 15, 1921. Application for reissue filed August 22, 1929. Serial No. 387,752.

My invention relates to the process of and means for flaking soap.

The invention is particularly concerned with producing flaked soap for use in the laundries, or in general by the housewife, although the theory involved may be advantageously employed as an intermediate step in the manufacture of cake or bar soap, where it is necessary to convert the liquid soap into chips in order to obtain the proper homogeneity when formed into bars or cakes.

The reason for the inability to manufacture a high grade of soap in flaked condition at a reasonably low cost has been due chiefly to the necessity of needless repetition of several steps in the process. Heretofore, flaked soap has been merely the cake soap cut up again into shreds in order to place it in a condition more suitable for use. This has resulted in increased cost in production. In reality, this soap is not flaked, but shaved, which of course must necessarily be of greater thickness.

From actual experience it has been found that shaved soap must be instantly soluble in the washing fluid, and as a requisite thereto, the shavings must be light and very thin, but such as will prevent massing or pasting together while in packages. Usually soap flakes are used where a saving in time and in labor is desired, and hence, if the flakes mass before being used, due to moisture, heat, or lack of thorough desiccation, the advantage ordinarily obtained by their use will be lost.

Practically all soap is flaked while in some stage of its making. This is particularly true of the higher grades of toilet soap, whose external appearance in bar form is greatly taken into account and considered as an important factor in marketing. In the manufacture of such soap, the liquid is usually poured into a trough, into which projects a rotary laminating roller, which wipes a thin layer of liquid soap on its periphery. The pellicle of soap is then passed between and onto a second laminating roller, and so on, until it is pressed into a thin sheet for shredding or chipping. The shreds are placed upon drying aprons, and a delivery apron is provided to receive the dried chipped soap from the last of the series of drying aprons. It is then thoroughly mixed with the requisite colors and scent, and again massed or kneaded in order to form it into rolls which are cut according to weight. These pieces are lastly placed in automatic stamping machines for caking or barring.

Obviously this process is tedious and expensive, particularly so when the soap thus produced is again shredded. These shreds usually are not of a fine texture, being too coarse to permit instant solubility.

According to the present invention, a thin flake is produced, being practically transparent and in a state next to powder. With the flakes in this condition, the field for the use of flaked soap is greatly extended. The flakes are in a perfect condition to obtain the desired solubility in the washing fluid.

Briefly, the theory involved includes spraying liquid soap in fine clouds upon a traveling apron, which results in the formation of a fine sheet of soap. This sheet of soap is then carried by the aprons through an evaporating zone, such as a hot or cold air blower directing currents against the apron, or such as a warm air oven or chamber housing a portion of the apron. The soap is thoroughly desiccated and is in a "frozen" or friable condition when reaching the end of the apron, so that it breaks up in fine flakes as the apron travels around the end roller. I propose employing various means for removing the soap from the apron, and even contemplating resorting to various forms of aprons, which will function to remove the soap when reaching a certain point.

I have found by reducing the density of the liquid soap before feeding it through the sprayers onto the apron, that the flakes will be light and porous, which of course permits greater solubility. This desired result is secured by first mixing the liquid soap, as it comes from the cooking vat, with a thinning fluid which reduces its consistency, so that it may be worked with greater facility when aerated by whipping or blowing air through, or other suitable process, so as to convert it into a mass whose weight is considerably less than that of the same volume of ordinary liquid soap. After aerated, the soap will be frothy and very light and may be sprayed with greater facility upon the apron. While a thinning fluid has been found desirable, its use is not essential to the aerating step, as liquid soap of any consistency may be whipped to increase its volume.

In the drawings: Figure 1 is a layout of apparatus for producing a flake embodying my invention;

Figure 1:
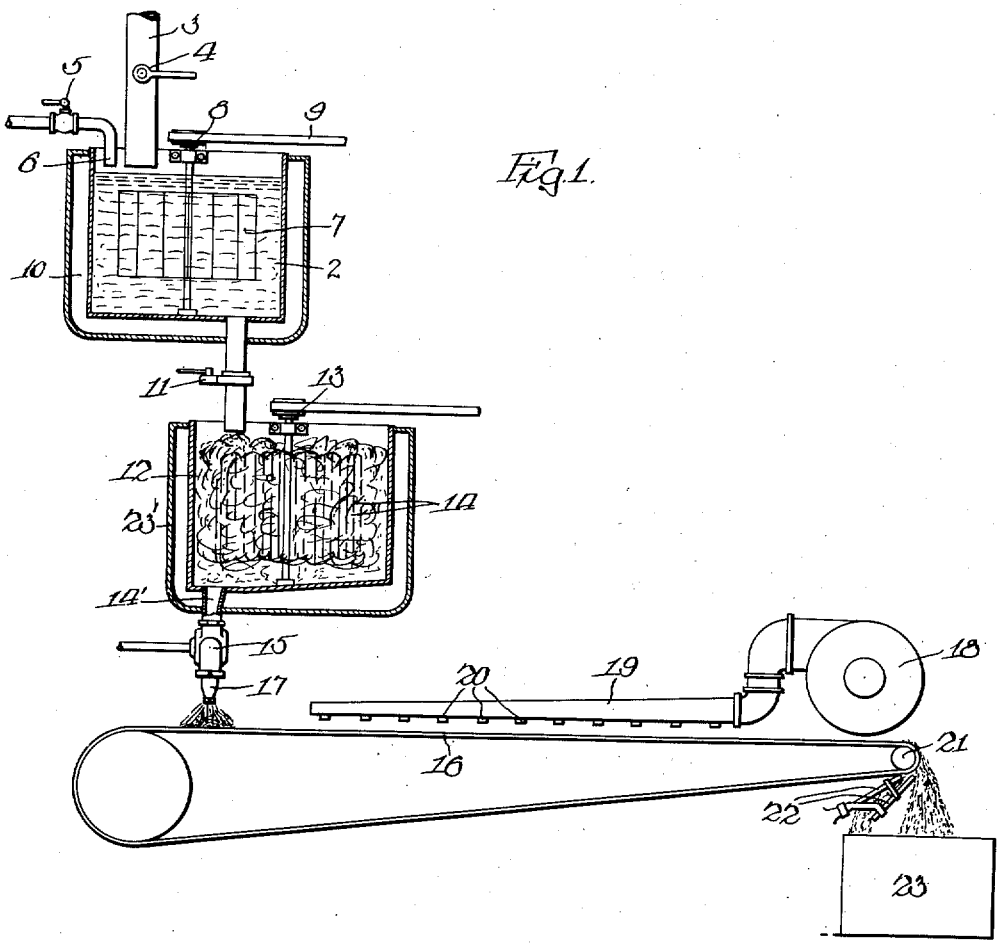

Referring to the illustration in Figure 1, liquid soap is fed into the vat 2 through the supply pipe 3 containing the supply control valve 4. The supply pipe 3 may lead directly from the large vat wherein the necessary constituents are thoroughly mixed and prepared into soap. The solution taken from such a vat may contain about 25% moisture. This, of course, may be varied. In the vat 2, the volume of liquid soap is increased by being mixed with water or other suitable fluid, such as alcohol or acetone, which reduces its density to permit freer flow, besides being thinned out considerably. The thinning fluid is fed into the vat 2 through the valve 5 and pipe 6. This fluid is mixed with the soapy solution by means of an ordinary wire stirrer 7 usually employed where a mixing action is preferable over an ebulliting or kneading action. The stirrer 7 is carried upon a shaft 8 which is driven by any suitable means, as for instance by a belt 9. A hot air jacket 10 surrounds the mixing vat 2 to keep the contents thereof at a certain temperature.

From the vat 2 the liquid soap of reduced consistency is fed through the valve 11 into the whipping vat 12, which, as shown, is of the ordinary type. The whipper comprises simply the belt driven shaft 13 carrying wires or rods 14, which stir and aerate the material. The construction is such that the stirring instrumentalities, i. e., wires or rods, pass through the viscid mass with a smooth-cutting, as again distinguished from either an ebulliting, or kneading action, whereby there is obtained indefinitely repeated cutting of the occluded air into smaller and smaller subdivisions with comparatively small levitation or expulsion thereof, or conversion of the mass throughout into froth or foam. In this machine, the liquid soap is brought into a foaming mass. During the aerating step, the liquid soap is kept at a certain temperature, which greatly facilitates the movement thereof, the heat being supplied by a warm air jacket 23′ surrounding the vat 12.

Therefrom it passes or preferably is sucked through a pipe 14′ by a pump 15, and sprayed in the form of a mist upon the traveling surface 16, forming a thin film or pellicle of soap whose thickness may be governed by the sprayer 17. The soap, owing to its plastic and adhesive character, will remain upon the belt and will spread evenly thereover by its own action. As the belt travels along its upper horizontal run, warm air of sufficient avidity to remove the moisture is directed against the soap by means of the blower 18 and manifold 19 having any number of jets 20 from which the air is emitted. By the time the soap reaches the end of the belt's horizontal run, it will be of a spongy and friable nature, that is, there will be a tendency for it to crumble into fine flakes as soon as it is disturbed. It is here proposed to provide such disturbance by creating an abrupt break in the straight run of the belt. The comparatively small diameter roller 21 serves this purpose, while, if so desired, an auxiliary means may be used to remove soap which persists in clinging to the belt. This auxiliary means is in the form of one or more blades 22, which lightly bear against the belt without wearing or destroying the same. It is to be noted that the flakes are permitted to drop practically untouched into the receptacle 23, which prevents lumping. It is further to be noted that the use of this particular process will produce a flake, which is very spongy in character, and which is friable, so that it will immediately break or crumble into bits when disturbed; the flake having a great avidity to dissolve instantly upon mixing with a washing fluid.

Figure 2:
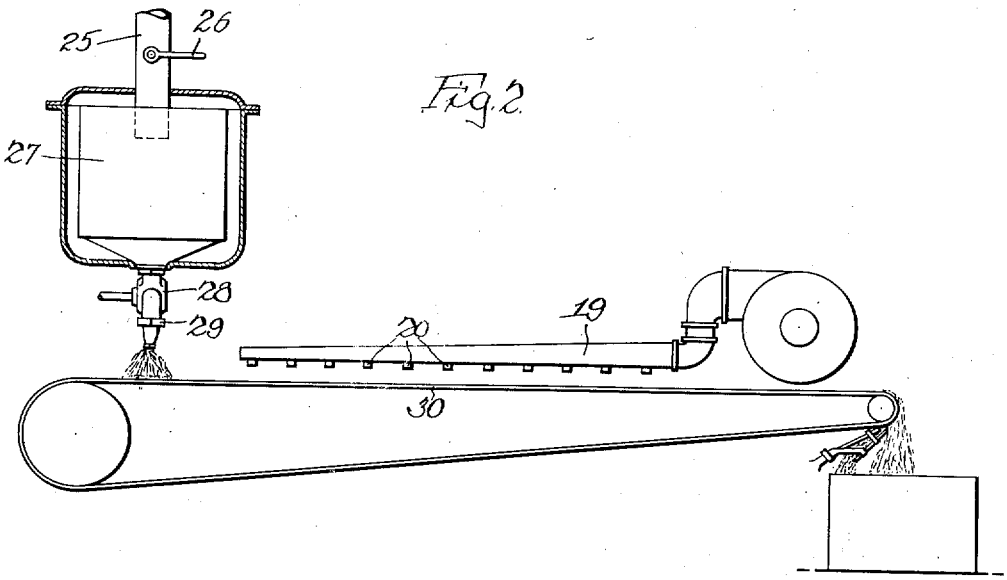
Figure 2 is an alternative lay out of apparatus embodying my invention.

An alternative process for flaking soap is shown in Figure 2. In this instance, the liquid soap is taken from the cooking vat (not shown) with a consistency of about 25% moisture, and fed through the supply pipe 25, the flow being controlled by the valve 26, to the vat 27. The liquid soap, while in this vat 27, is kept at a certain temperature to prevent cooling off which is apt to result in crusting, but this has been found not necessary. With the soap in such state, it is advisable to employ a pump 28, preferably of the ordinary centrifugal type, to draw the soap from the vat 27 and force it through the sprayer 29, which divides the flow, so that the soap is discharged in a comparatively fine mist, which settles upon the traveling surface 30 in a thin sheet. This sheet of soap is advanced under the streams of warm air emitted from the jets 20 of the manifold 19. The length of the belt's horizontal run is such as will permit a manifold of sufficient capacity to be used to desiccate the soap film, and also permit adequate cooling of the soap film before it is disturbed and crumbled into flakes.

Figure 3:
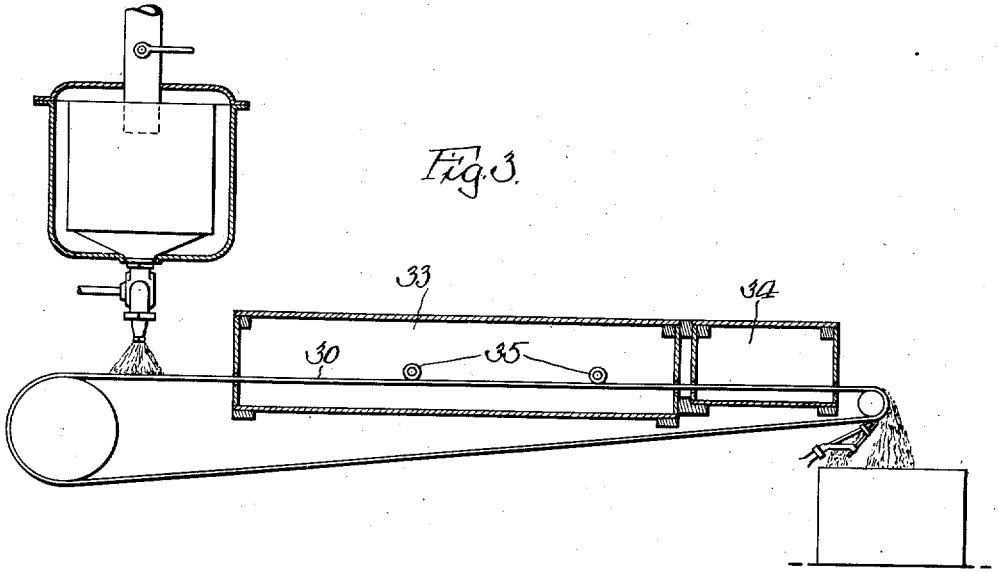
Figure 3 illustrates a form similar to Figure 2; but showing the use of a hot air oven and cooling chamber.
Figure 4:
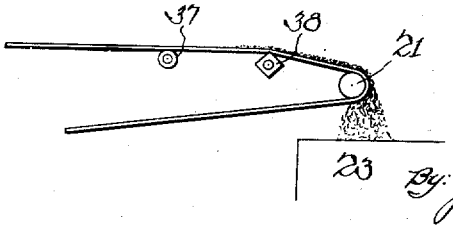
Figure 4 illustrates an alternative means for removing the soap from the apron after it is desiccated.

By referring to Figure 3, an alternate suggestion for desiccating the soap film upon the traveling surface will be seen. It is considered a matter of ordinary mechanical skill to propose a different method for desiccating the soap upon the surface 30, as the scope of the present invention should extend to any method of desiccation. The particular construction shown in Figure 3 comprises a warm air oven 33 through which the surface 30 is led. Freely rotating rollers 35 may be mounted within this warm air oven 33 and adjusted so as to engage lightly the pellicle of soap on the belt. This will, more or less, roll out the pellicle soap in a positive fashion, the purpose being primarily to remove the gloss and to prevent crusting of the surface, which causes uneven drying.

From experience it has been found that soap flakes will remain in a very much better condition if thoroughly cooled before placing in packages; while oftentimes a finer quality of flake is obtained by removing the heat before it is crumbled. A cool air chamber 34 is provided for this purpose and is preferably disposed adjacent to the warm air oven 33, at the end of the belt's travel.

In the forms thus far described, a scraper knife is employed to assist in removing the flake from the traveling surface. Should this not be preferred, other means may be employed, such as for instance lowering the end roller 21 slightly and using a freely rotatable roller 37 to maintain a greater portion of the belt run horizontal. The belt between the roller 37 and roller 21 will slant slightly downwardly, with the roller 38 having an irregular periphery to provide the necessary vibrations, to loosen and crumble the soap, interposed therebetween. Thus, no element comes into contact with the soap, after it has been desiccated, to crumbled it.

Without further elaboration, the foregoing will so fully explain the gist of my invention, that others may, by applying current knowledge, readily adapt the same for use under varying conditions of service. The invention is not to be limited to aerating to cause frothing of the liquid soap before it is spread upon the belt. The invention will, however, produce a flake which is very desirable, being spongy, friable, and of a very soluble character. The feature of spraying a thin film of soapy solution upon a traveling (horizontal) surface, against which is directed currents of warm air, and then disturbing the desiccated soap by changing the direction of travel of the surface, is considered of importance. However, the general mode of operation may obviously be changed without eliminating important parts, which may properly be said to constitute the essential features of novelty involved in my invention.

The invention aims to produce a soap flake of higher quality over what has heretofore been made. To this end, a process is suggested, the nature of which is such that various steps may be omitted without deviating from the invention with respect to changing the nature of flake produced, as is contemplated within the limits of the present case. Of the steps that may be omitted or interchanged, that of aerating to increase the volume per unit of weight is mentioned. Variation of this latter step is possible within a wide range, and hence, it is the increased volume which is sought. Laying the liquid soap on the belt by a sprayer may be omitted when the aerating or other volume increasing means are employed.

I claim:

1. The method of flaking soap which comprises first spraying it while in liquid form into a thin film, next, operating upon the film to cause desiccation, and finally, disturbing the desiccated film to cause disintegration into flakes.

2. The method of flaking soap which comprises first laying a layer of liquid soap upon a surface, next, conditioning said soap while upon the surface by desiccation to remove substantially the entire moisture therein, and finally, breaking said soap into pieces by changing the contour of said surface after said conditioning has taken place.

3. The method of flaking soap which comprises first spraying liquid soap upon a moving surface, next, passing said surface through a desiccation zone to remove the moisture in the soap, and finally, removing the soap in flaked condition from said surface.

4. The method of flaking soap which comprises first spraying a thin film of liquid soap upon a traveling surface, next, passing said surface through a hot air zone to remove the moisture contained in the soap, next, changing the travel of said surface to cause breaking up of said soap, and finally, scraping said surface to remove whatever soap that remains thereon.

5. The method of flaking soap which comprises, first spraying a thin film of liquid soap upon a traveling surface, next, passing said surface through a hot air zone to remove the moisture contained in the soap, next, passing said surface through a cooling zone to lower the temperature of the desiccated soap, and finally, changing the travel of said surface to cause breaking up of said soap.

6. The method of flaking soap which comprises first spraying a thin film of liquid soap upon a traveling surface, next, passing said surface through a hot air zone to remove the moisture contained in the soap, and next, passing said surface through a cooling zone to lower the temperature of the desiccated soap before removing soap from said surface and finally removing the desiccated soap in the form of flakes.

7. The method of flaking soap which comprises first reducing the density of a body of liquid soap so that it will be of a desired consistency, next, converting the body of liquid soap into an aerated and foamy mass, next, shaping said mass into a film of desired thickness, next, drying said sheet, and finally, producing flakes therefrom.

8. In the method of flaking soap which comprises first converting a body of liquid soap into a frothy or foamy mass, next, laying said mass upon a surface in form of a substantially thin sheet, and finally, drying said sheet so as to render the same friable and crumbly, whereby to divide said sheet into flakes.

9. In the method of flaking soap which comprises first mixing a thinning fluid with a body of liquid soap, next, whipping said body of liquid soap into a froth, next, desiccating to any desired degree, the frothed soap to render it friable, and finally flaking the soap.

10. In the method of flaking soap which comprises first mixing a thinning fluid with a body of liquid soap, next, frothing said body of liquid soap by whipping and admitting air thereinto, next, placing the soap upon an exposed surface, next, passing said surface through a desiccating zone to dry said soap, and finally flaking the soap.

11. In the method of flaking soap which comprises first mixing a thinning fluid with a body of liquid soap, next, admitting air into said body of liquid soap by whipping, next, placing the aerated liquid soap upon a traveling surface, next, desiccating said aerated liquid soap, and finally, removing the aerated soap in form of crumbled flakes by disturbing said traveling surface.

12. In the method of flaking soap which comprises first aerating by whipping a body of liquid soap, next spraying the aerated liquid soap upon a traveling surface, next, desiccating said aerated soap, and finally, removing the aerated soap in form of crumbled flakes by disturbing said traveling surface.

13. In combination, a source of liquid soap, a vat for receiving said liquid soap, an apron, means for removing said liquid soap from said vat to place it upon said apron in a thin sheet, means for directing currents of air of sufficient avidity to remove moisture from said sheet of soap, and means substantially at the end of said apron to crumble and remove said soap.

14. In combination, a source of liquid soap, a traveling apron, means for placing said soap upon said apron in form of a thin sheet, means for desiccating said sheet of soap while on said apron, the direction of travel of said apron being changed to crumble said soap into flakes, and additional means for assisting in removing said soap from said apron.

15. In combination, a source of liquid soap, an apron, a sprayer for spraying said liquid soap upon said apron, a hot air zone through which said apron is passed, a cold air zone through which said apron also is passed, and means for disturbing said apron substantially at its end to crumble the soap into flakes.

16. In combination, a source of liquid soap, means for converting the liquid soap into a froth, a sprayer for spraying said froth upon an apron, a desiccating zone for rendering said froth in a friable condition, and means for disturbing the friably conditioned froth so as to remove it from the apron in form of flakes.

17. In combination, a source of liquid soap, a converter for converting said liquid soap into a froth, a sprayer for spraying the froth upon an apron, a warm air zone for removing moisture from said froth, a cool air zone for removing heat from said froth, and means at the end of the apron to disturb said froth.

18. The method of producing soap flakes having a high degree of porosity and easily soluble in water which comprises spraying liquid soap of a high air content upon a moving surface, and then removing the moisture or hardening the soap whereupon the air is allowed to escape and the soap rendered friable and finally disintegrating the same into flakes.

19. The method of producing soap flakes having a high degree of porosity and easily soluble in water which comprises spraying in fine clouds a liquid soap of a high air content upon a moving surface whereby the air may be readily released during the hardening of the soap, and finally disturbing the soap so that it will crumble into flakes of crystalline appearance upon being removed from said surface.

20. The method of producing soap flakes having a high degree of porosity and easily soluble in water which comprises taking liquid soap of any density and adding a thinning fluid thereto whereby the liquid soap may be given a desired volume of air by subsequent agitation, then applying the soap to a surface in a manner to continue the agitation and the admixture of air with the soap but upon being spread upon said surface to effect a release of the air during a subsequent drying or hardening step, and finally removing the soap from said surface in the form of flakes or like particles.

21. The method of producing soap flakes easily soluble in water which comprises spraying liquid soap of a high air content upon a moving surface in a substantially thin layer whereby upon hardening of the soap the walls thereof confining the air therein will contract and release the air, and finally removing the hardened air-freed soap from said surface for disintegration into separate flakes or particles.

22. The process of manufacturing soap in particle form having voids therein which comprises adding water to ordinary soap stock of commercial manufacture to make it a free flowing liquid soap solution and heating the same to maintain it at a certain temperature whereby the soap solution will be kept in a good free flowing state, effecting the void formation and the solidification of the soap into permanent form retaining condition by inflating the soap to increase the volume thereof and removing the moisture by subjecting it to currents of heated drying gas until the moisture content is reduced to a desired value, and collecting the soap substantially at the end of the heat treatment in the form of solidified particles having voids therein.

23. The process of manufacturing soap in substantially dry void-containing particle form which comprises adding water thereto to make it a free flowing liquid soap solution capable of inflation to increase the volume thereof and promote the formation of voids therein, evaporating the moisture from the soap solution by inflating the same and subjecting it to currents of heated drying gas while evaporation takes place until the moisture content is reduced to a desired value, and collecting the soap substantially at the end of the heat treatment in the form of solidified void-containing particles.

24. The process of producing a reasonably finely divided soap in characteristically dry porous component particles of void formation quickly soluble in a washing fluid which comprises adding water to ordinary soap stock of commercial manufacture to make it a free flowing liquid soap stock capable of being readily sprayed in a finely divided condition, then spraying said soap in a finely divided condition and effecting formation of said characteristically dry porous component particles by inflating the same to promote void formation and solidification thereof into permanent form-retaining condition by a heat treatment involving bringing said soap after sprayed into contact with currents of heated gas until the formation of said dry porous inflated particles takes place and the solidification thereof into notably porous structures having voids therein is effected.

25. The process of producing a soap product of characteristically dry porous component particles quickly soluble in a washing fluid which comprises adding water to ordinary soap stock of commercial manufacture to make it a free flowing liquid stock capable of being readily sprayed, then spraying the liquid soap and thereafter allowing it to move into contact with currents of heated gas, and effecting solidification into permanent form by said heat treatment, said heat treatment continuing until the formation and solidification are complete and said particles are produced in a porous condition substantially dry throughout.

26. The process of producing a reasonably finely divided soap in characteristically porous component void containing particles which comprises adding water to ordinary soap stock of commercial manufacture to make it a free flowing soap solution, and effecting formation and solidification of said characteristically porous component void-containing particles by spraying said soap solution of increased liquidity and bringing it after sprayed into contact with heated desiccating gas until the moisture content is reduced to a desired value, then lowering the temperature of the soap by bringing it into contact with cooling gas, the formation of said component void containing particles including inflating the soap, in its treatment, to effect permanent formation of said voids so that upon completion of said desiccating and cooling the soap may be removed as component particles with voids therein.

27. The process of producing a reasonably finely divided soap in characteristically porous component void containing particles which comprises adding water to ordinary soap stock of commercial manufacture to make it a free flowing liquid stock, and effecting formation and solidification of said characteristically porous component void containing particles by spraying said liquid soap of increased liquidity and bringing it after sprayed into contact with currents of heated drying gas, the formation of said component void containing particles including inflating the soap, in its treatment, to effect permanent formation of said voids so that, upon completion of said drying, the soap may be removed as component particles with voids therein.

In testimony whereof, I have subscribed my name this 5th day of August, 1929.

BERTRAM WM. COLTMAN.

CERTIFICATE OF CORRECTION.

Reissue No. 18,546. July 26, 1932.

BERTRAM W. COLTMAN.

It is hereby certified that error appears in the printed specification of the above numbered patent requiring correction as follows: Page 5, line 23, claim 23, strike out the word "thereto" and insert the words to ordinary soap stock of commercial manufacture; and that the said Letters Patent should be read with this correction therein that the same may conform to the record of the case in the Patent Office.

Signed and sealed this 8th day of November, A. D. 1932.

M. J. Moore,
Acting Commissioner of Patents.

(Seal)